United States Patent
Isaacs

[11] Patent Number: 5,865,997
[45] Date of Patent: Feb. 2, 1999

[54] SCRAPER BLADE ASSEMBLY

[75] Inventor: Jonathan Paul Isaacs, Houston, Tex.

[73] Assignee: Ashbrook Corporation, Houston, Tex.

[21] Appl. No.: 835,805

[22] Filed: Apr. 16, 1997

Related U.S. Application Data

[60] Provisional application No. 60/014,640, Mar. 17, 1996.
[51] Int. Cl.$^6$ .................................................. B01D 33/46
[52] U.S. Cl. ........................ 210/232; 210/238; 210/396; 210/401; 198/499
[58] Field of Search ................................... 210/232, 237, 210/238, 396, 400, 401, 408; 198/499

[56] References Cited

U.S. PATENT DOCUMENTS

| | | | |
|---|---|---|---|
| 1,279,063 | 9/1918 | Witmer . | |
| 1,781,389 | 11/1930 | Heritage . | |
| 3,722,684 | 3/1973 | Maestrelli | 210/167 |
| 3,984,329 | 10/1976 | Wenzel et al. | 210/396 |
| 3,994,385 | 11/1976 | Reiter | 198/499 |
| 3,994,388 | 11/1976 | Reiter | 198/499 |
| 4,053,045 | 10/1977 | Reiter | 198/499 |
| 4,147,634 | 4/1979 | Weneger | 210/396 |
| 4,154,686 | 5/1979 | Ootani et al. | 210/328 |
| 4,666,602 | 5/1987 | Hartzell | 210/298 |
| 4,731,188 | 5/1988 | Johnson et al. | 210/783 |
| 4,795,024 | 1/1989 | Eatwell | 198/499 |
| 4,818,296 | 4/1989 | Hejman et al. | 127/2 |
| 4,836,100 | 6/1989 | Johnson et al. | 100/118 |
| 4,879,033 | 11/1989 | Rich | 210/396 |
| 4,958,719 | 9/1990 | Hourticolon et al. | 198/499 |
| 5,059,322 | 10/1991 | Austin | 210/396 |
| 5,133,863 | 7/1992 | Zander | 210/396 |
| 5,133,872 | 7/1992 | Baldwin et al. | 210/709 |
| 5,135,651 | 8/1992 | Austin et al. | 210/396 |

*Primary Examiner*—Jay H. Woo
*Assistant Examiner*—Betsey J. Morrison
*Attorney, Agent, or Firm*—Webb Ziesenheim Bruening Logsdon Orkin & Hanson, P.C.

[57] ABSTRACT

A scraper blade assembly utilizes an over-center spring to bias the scraper blade assembly both into engagement and out of engagement with a conveyor, such as a moving belt, on a device for separating solids from liquids. The over-center spring extends between a fixed attachment point on the device and a pivoting attachment point on a handle secured to the scraper blade assembly. The invention is particularly applicable to belt filter presses and gravity belt sludge thickeners. An over-center spring may be secured to both ends of the scraper blade assembly to minimize torsional deformation of the scraper blade by the material being separated from the moving belt.

19 Claims, 2 Drawing Sheets

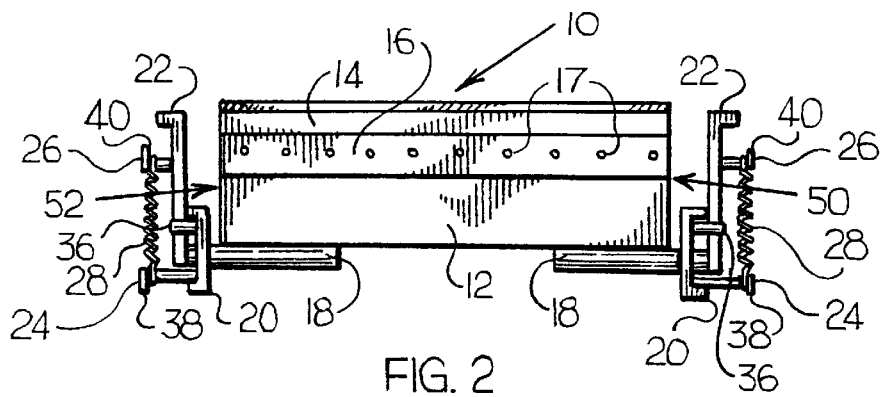
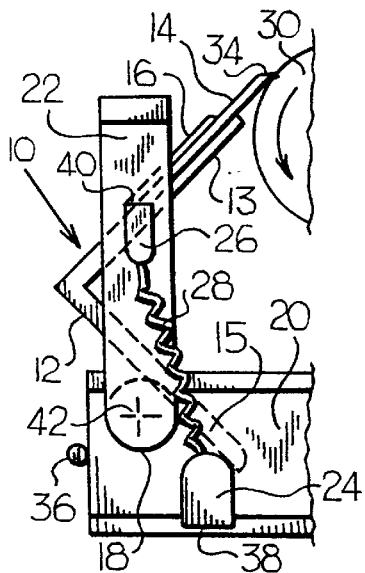
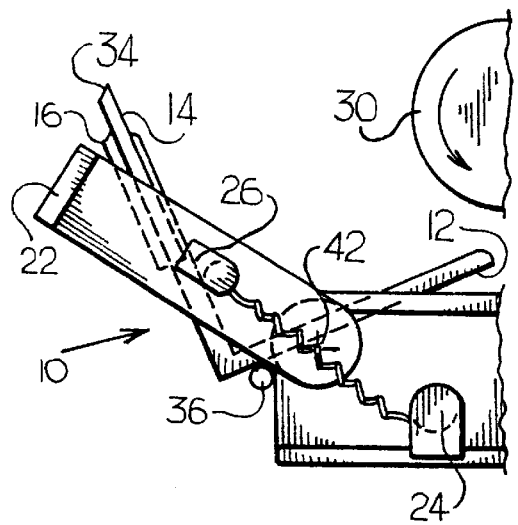
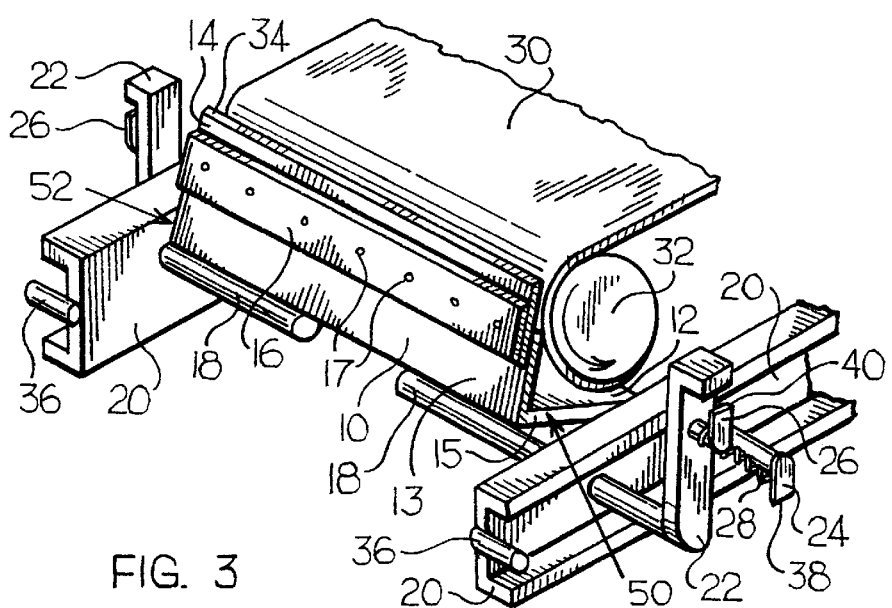

SCRAPER BLADE ASSEMBLY

This application claims priority of Provisional Application No. 60/014,640, filed Apr. 17, 1996.

BACKGROUND OF THE INVENTION

1. Field of the Invention

This invention relates to scraper blades for moving belts and, more particularly, to pivoting scraper blade assemblies which may be biased into engagement and biased out of engagement with the moving belt.

2. Description of Prior Art

Devices for separating solids from liquids, such as belt filter presses and gravity belt sludge thickeners, utilize moving belts. Belt filter presses use a series of cylindrical rollers about which a pair of belts is wrapped in a serpentine path. As the belts pass around each successive roller, liquid is pressed out of a material that is previously introduced between the belts while the solid matter remains trapped inside. Gravity belt sludge thickeners operate in a similar manner but separate the water from the solid mass from the effects of gravity only. These presses and thickeners typically use scraper blades at the discharge point of their process in order to scrape off any dewatered material that may have been pressed into or otherwise stuck to the weave of the belts. Scraper blades may also be positioned at other locations separate from the discharge point to aid in cleaning.

Scraper blade assemblies are necessary to insure that the solid material does not become reintroduced into the closed loop system of the press, which can be detrimental to both the performance and life of the press. At the same time, the scraper blade assemblies must allow some "give" for the seams of the belt, as well as allowing movement of the scraper blade away from the belt for cleaning and maintenance purposes.

Present scraper blade assemblies in use on belt filter presses and gravity belt sludge thickeners include a combination of springs, cams, rollers and brackets in order to engage or disengage the blade from the belt. These are complex and costly arrangements that limit the utility and flexibility of the scraper blade assembly. In addition, for very-wide machines, these arrangements often do not provide sufficient force for the scraper blade to work effectively when held against the belt.

U.S. Pat. No. 3,722,684 to Maestrelli discloses equipment for pre-filtering a solvent, particularly in dry-cleaning machines, wherein a scraper blade is kept under the action of a counterweight or spring in engagement with the outer cylindrical wall of a rotating drum. The adhesion or friction pressure of the blade against the drum is adjustable by adjustment of the spring force or the counterweight load.

U.S. Pat. No. 5,133,863 to Zander discloses a stripping device for rotary filters wherein a scraper blade scrapes filter cake from a belt. The scraper blade is carried on a cross bar, which in turn carries a weight. The weight may be adjusted to adjust the force of the scraper blade acting on the belt filter cake. A tilting device is arranged between the cross bar and the weight. A tie bar functions as a safety device against overthrow so that the tilting device is not overthrown when under too great a load. The center of gravity of the weight must always be between a transverse shaft and a belt if the scraper is to be engaged on the belt. The tilting device will tilt out of engagement with the belt when a temporarily large load on the scraper blade arises.

U.S. Pat. No. 4,154,686 to Ootani et al. discloses an apparatus for continuous liquid-solid separation having pivoting side plates which hold filter cloth on the device. The side plates are connected to a movable lever via a spring. When the lever is pushed outward, the spring causes the pivoting side plates to disengage from the filter cloth.

There remains a need for a scraper blade assembly for devices for removing liquids from solids which eliminates cams, brackets and levers and replaces them with a simplified singular arrangement for both engaging and disengaging the scraper blade. Furthermore, there is a need for a scraper blade assembly which may employ springs on either end of the scraper blade to resist torsional deformation which material being separated from the belt may impose on the scraper blade. There is also a need for a scraper blade which may be securely disengaged from the belt a greater distance from the belt than prior art arrangements, to facilitate cleaning and maintenance of the scraper blade assembly and the belt. There is also a need for a scraper blade assembly which provides a standardized design for various belt filter press and gravity belt sludge thickener machines.

SUMMARY OF THE INVENTION

Accordingly, I have invented a scraper blade assembly for a conveyor on a device for separating solids and liquids. The scraper blade assembly has a pivoting scraper blade support and a first fixed attachment point on the device for separating solids and liquids. A second attachment point is on the scraper blade support. An over-center spring extends between the first and second attachment points. The scraper blade is located on the scraper blade support, and the scraper blade is biased into engagement with the conveyor by the over-center spring. The over-center spring and the scraper blade support are also adapted for biasing the scraper blade out of engagement with the conveyor.

The scraper blade support may include a rigid L-shaped member pivotally mounted on the device for separating solids and liquids. The over-center spring is mounted so that it is fully extended and under maximum tension when the scraper blade support is pivoted so that a pivot point for the scraper blade support is in alignment between the first fixed attachment point and the second attachment point. The L-shaped member may have a pivot point on or adjacent one leg of the L-shaped member, with the scraper blade mounted on the other leg of the L-shaped member. A cylindrical shaft may be secured to the first leg, thus defining the pivot point.

Two shafts, one secured at each of the first end and the second end of the rigid L-shaped member, may be journaled on the device for separating solids and liquids, each shaft being coaxial with the pivot point.

The scraper blade assembly may include a handle on the shaft, with the second attachment point positioned on the handle. The first fixed attachment point may be positioned on a frame which forms part of the device for separating solids and liquids.

The scraper blade assembly may include a stop on the device for separating solids and liquids, the stop limiting the motion of the scraper blade support when the scraper blade support is pivoted to bring the scraper blade out of engagement with the conveyor.

The device for separating solids and liquids may be a belt filter press, with the conveyor being a moving belt. The belt filter press may have a frame, the frame having two rails, one positioned adjacent each lateral edge of the belt, with the shafts journaled in the rails and the first fixed attachment point positioned on one of the rails. A longitudinal axis for the scraper blade is preferably parallel to a width dimension for the belt.

Further details and advantages of the invention will become apparent from the following detailed description, in conjunction with the drawings, wherein like reference numerals represent like parts.

BRIEF DESCRIPTION OF THE DRAWINGS

FIG. 1 is a side view of a scraper blade assembly with the scraper blade engaged on a moving belt;

FIG. 2 is an end view of a scraper blade assembly according to the present invention;

FIG. 3 is a perspective view of the scraper blade assembly of FIG. 1;

FIG. 4 is a side view showing a scraper blade assembly according to the present invention in a disengaged position;

DETAILED DESCRIPTION OF THE PREFERRED EMBODIMENTS

Figure 5:
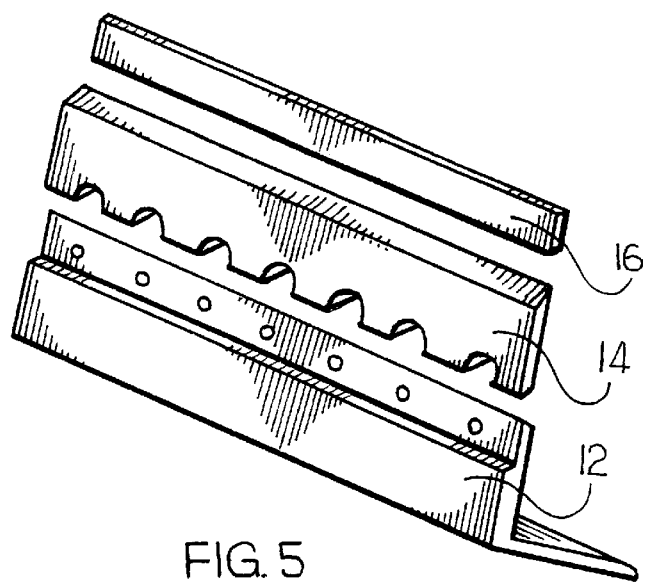
FIG. 5 is an exploded view of a scraper blade with a cover plate and rigid L-shaped member according to the present invention.

FIGS. 1–3 show a scraper blade assembly 10 according to the present invention. Scraper blade assembly 10 has a rigid L-shaped member 12 which may be a metallic angle and includes a first and 50 and a second end 52. A first leg 13 of rigid L-shaped member 12 carries scraper blade 14. Scraper blade 14 is secured to first leg 13 by a cover plate 16 and several hold down fasteners 17, such as screws. The second leg 15 of rigid L-shaped member 12 is welded to two shafts 18, each shaft 18 positioned at an opposing end of rigid L-shaped member 12. FIG. 5 shows rigid L-shaped member 12, scraper blade 14 and cover plate 16 in an exploded view.

Shafts 18 are journaled in frames 20, which form part of a device for removing solids from liquids, such as a belt filter press or a gravity belt sludge thickener. The frames 20 preferably include two rails having the shafts 18 journaled therebetween. Further details on a belt filter press with which the present invention may be used are set forth in U.S. Pat. No. 5,133,872 entitled "Method and Apparatus for Controlling Throughput in a Beltpress", incorporated herein by reference.

Referring to FIGS. 2 and 3, handles 22 are positioned at the outer ends of shafts 18. Rigid L-shaped member 12, shafts 18 and handles 22 define a pivoting scraper blade support. The shafts 18 include two shafts, one secured at the first end 50 and the other secured at the second end 52 of the rigid L-shaped member 12. A first fixed spring mount 24 is positioned on each frame 20 adjacent and below its respective shaft 18. A second spring mount 26 is mounted on each handle 22, generally on an opposite side of shaft 18 from first fixed spring mount 24. Over-center springs 28 extend between each first fixed spring mount 24 and each second spring mount 26. Scraper blade 14 removes solid material from a perforate conveyor, such as moving belt 30, which is moved by roller 32.

A longitudinal axis of scraper blade 14 is parallel to a width-wise dimension of belt 30, and the length of scraper blade 14 is equal to or greater than the width of belt 30. Scraper blade 14 preferably has a beveled edge 34, which faces away from roller 32. A handle stop 36 is positioned on the end of each frame 20 to limit the pivoting motion of handle 22.

First spring mount 24 has a downwardly directed catch 38, while second spring mount 26 has an upwardly directed catch 40. Shafts 18 define and are coaxial with pivot points 42. Handles 22 rotate about the pivot points 42, as does the scraper blade assembly 10. Handles 22 may be secured to shafts 18 by a sleeve and set screw arrangement (not shown), the shafts 18 received in sleeves on handles 22. Shafts 18 may be welded to the second leg 15 of rigid L-shaped member 12.

Figure 6:
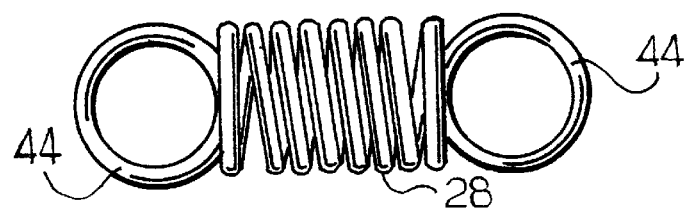
FIG. 6 is an elevation view of a spring for use with the present invention.

Referring to FIG. 6, an over-center spring 28 according to a preferred embodiment of the present invention is shown. Over-center spring 28 has loops 44 at either end of spring 28 for securing over-center spring 28 to first and second spring mounts 24, 26. In the preferred embodiment of the invention, for application on a belt filter press, over-center spring 28 is made from stainless steel and is approximately 4.5 inches long, with a 1.5 inch outer diameter and a 0.177 inch wire diameter. The dimensions of over-center spring 28 dictate the relative spacing of mounts 24 and 26, as will be apparent to those skilled in the art upon reading the instant specification.

Shafts 18 may be journaled in frames 20 by a collar and bushing arrangement (not shown) or any other suitable arrangement which allows free rotation of shafts 18 with minimal wear.

As used in the specification and claims herein, the term "over-center spring" is meant to define a spring extended between a fixed first attachment point (e.g., first fixed spring mount 24) and a second attachment point located on a lever arm (e.g., handle 22), with the pivot point of the lever arm e.g., pivot points 42) locatable between the first fixed attachment point and the second attachment point. An over-center spring according to the present invention will be under maximum tension, and extended to its greatest length, when the lever arm is pivoted so that the second attachment point, the pivot point and the first attachment point are aligned with one another, with the pivot point located between the first and second attachment points. On either side of this fully extended, fully tensioned position, the over-center spring will act to draw the pivot arm one way or the other, depending on which side of the pivot point the lever arm is urged.

Figure 7:
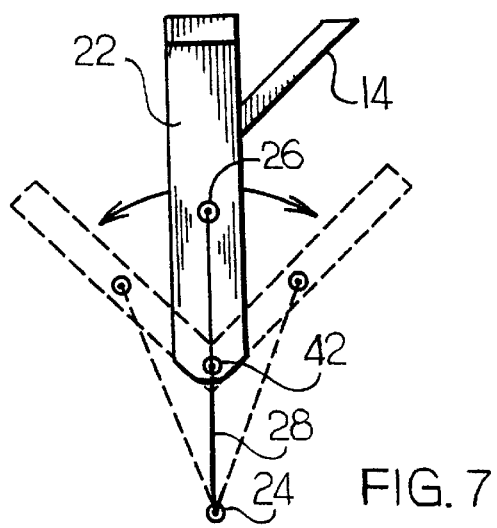
FIG. 7 is a schematic view showing the range of motion of a scraper blade, a handle and an over-center spring according to the invention.

Referring to FIG. 7, by way of explanation, handle 22 pivots about pivot point 42. Over-center spring 28 extends between first fixed spring mount 24 and second spring mount 26. In the upright position shown in FIG. 7, handle 22 is unstable since over-center spring 28 is fully extended and under maximum tension. In order to return to a relaxed state, over-center spring 28 urges handle 22 to pivot clockwise or counterclockwise about pivot point 42. This principle is utilized in the present invention to urge scraper blade 14 into engagement with or disengagement with belt 30, according to the direction in which a user urges handle 22 about the pivot point 42. Referring to FIG. 1, handle 22 has been urged clockwise about pivot point 42 to engage scraper blade 14 on belt 30. Over-center spring 28 will maintain tension on second spring mount 26 which translates that tension via handle 22 and shaft 18 to scraper blade 14, urging the blade into engagement with belt 30.

Referring to FIG. 4, a user has rotated handle 22 counterclockwise about pivot point 42, past the point where first mount 24, pivot point 42 and second mount 26 are aligned with one another and past the point where over-center spring 28 is fully extended under maximum tension. Scraper blade assembly 10 is therefore urged in a counterclockwise direction, out of engagement with moving belt 30. Stop 36 limits the range of motion of handle 22 in the disengagement direction. To reengage scraper blade 14 on belt 30, the user would again urge handle 22 clockwise, beyond the point of alignment of pivot point 42 with mounts 24 and 26 so that over-center spring 28 urges scraper blade assembly 10 into engagement with belt 30. Thus, depending on which direction the handle 22 is rotated by the operator, the over-center spring 28 will either pull the scraper blade assembly 10 against the belt 30, or pull the scraper blade assembly 10 against handle stop 36 so that it is securely removed from the belt.

When the scraper blade 14 is engaged to belt 30, the over-center spring 28 is in a stable state and will resist any movement that might push the scraper blade 14 away from the belt 30. On the other hand, the over-center spring 28 will give when belt seams contact the scraper blade 14. The mechanical advantage provided by the handle 22 allows the user to tip the over-center spring 28 past the unstable center point so that it is once again in a stable state, holding the scraper blade 14 away from belt 30.

The over-center spring of the present invention can easily be mounted on both ends of scraper blade assembly 10. This is advantageous in that the distance between the actuating force of the spring and the farthest possible point away from it on the scraper blade 14 is cut in half. Since torsional deformation has a cubic relationship with the length involved, rigid L-shaped member 12, or whatever the equivalent apparatus on the scraper blade assembly 10, may be made from lighter material while providing a better cleaning action due to less deflection of the scraper blade 14.

Since there are less parts involved with the scraper blade assembly of the present invention, the assembly requires less time to install on a machine. When disengaged, the scraper blade will be held out farther from the belt 30 than the previous arrangements in the prior art, which are limited to the size of the cam for displacement. This will allow for easier cleaning and maintenance at the discharge points on a belt press.

The simple, inexpensive design of the scraper blade assembly 10 facilitates making the design a standard for various dewatering equipment. This will provide cost savings from reduced inventory and large production runs.

Having described the best mode and presently preferred embodiment of the invention, it will be understood that various modifications and improvements to the invention may be made without departing from the spirit and scope of the invention. Accordingly, it is not intended to limit the invention except as set forth in the following claims.

What is claimed is:

1. A scraper blade assembly for a conveyor on a device for separating solids and liquids, comprising:
   a pivoting scraper blade support;
   a first fixed attachment point on said device for separating solids and liquids;
   a second attachment point on said scraper blade support;
   an over-center spring extending between said first and second attachment points; and
   a scraper blade located on said scraper blade support, said scraper blade biased into engagement with said conveyor in a first position by said over-center spring, said over-center spring and said scraper blade support biasing said scraper blade in a second position out of engagement with said conveyor.

2. The scraper blade assembly of claim 1 wherein said over-center spring is mounted so that said over-center spring is fully extended and under maximum tension when said scraper blade support is pivoted so that a pivot point for said scraper blade support is in alignment between said first fixed attachment point and said second attachment point.

3. The scraper blade assembly of claim 1 wherein said scraper blade support includes a rigid L-shaped member having said scraper blade mounted on a first leg of the L-shaped member and a pivot point on or adjacent a second leg of the L-shaped member.

4. The scraper blade assembly of claim 3 wherein said scraper blade support includes a cylindrical shaft secured to said second leg, said shaft defining said pivot point, said shaft journaled on said device for separating solids and liquids.

5. The scraper blade assembly of claim 4 including two said shafts, one secured at each of a first end and a second end of said rigid L-shaped member, each shaft journaled on said device for separating solids and liquids, each shaft being coaxial with said pivot point.

6. The scraper blade assembly of claim 4 including a handle on said shaft, said second attachment point positioned on said handle.

7. The scraper blade assembly of claim 1 wherein said device for separating solids and liquids includes a frame, said first fixed attachment point positioned on said frame.

8. The scraper blade assembly of claim 1 including a stop on said device for separating solids and liquids, said stop limiting the motion of said scraper blade support when the scraper blade support is pivoted to bring said scraper blade out of engagement with said conveyor.

9. The scraper blade assembly of claim 1 wherein said device for separating solids and liquids is a belt filter press and said conveyor is a moving belt.

10. The scraper blade assembly of claim 9 wherein said belt filter press has a frame, said frame including two rails, one rail positioned adjacent each lateral edge of said belt, and said scraper blade assembly includes a cylindrical shaft, said shaft journaled in said rails, said first fixed attachment point positioned on one of said rails.

11. The scraper blade assembly of claim 9 wherein a longitudinal axis for said scraper blade is parallel to a width dimension for said belt.

12. A scraper blade assembly for a moving belt on a device for separating solids and liquids, comprising:
   a pivoting scraper blade support including a rigid member having a first end and a second end;
   two fixed attachment points on said device for separating solids and liquids located adjacent said first end and second end of said rigid member, respectively;
   a handle positioned at each of said first and second ends of said rigid member;
   a pivoting attachment point positioned on each of said handles, with a pivot point for said scraper blade support positionable between said fixed and pivoting attachment points;
   an over-center spring extending between each of said fixed and pivoting attachment points; and
   a scraper blade located on said scraper blade support, said scraper blade biased into engagement with said belt in a first position by said over-center springs, said scraper blade support pivotable to disengage said scraper blade with said belt, said over-center springs biasing said scraper blade and said scraper blade support in the disengaged position.

13. The scraper blade assembly of claim 12 wherein said scraper blade support includes a rigid L-shaped member pivotally mounted on said device for separating solids and liquids.

14. The scraper blade assembly of claim 13 wherein said over-center springs are mounted so that they are fully extended and under maximum tension when said scraper blade support is pivoted so that said pivot point for said scraper blade support is in alignment between said first fixed attachment points and said second attachment points.

15. The scraper blade assembly of claim 12 wherein said scraper blade support includes two shafts journaled on said device, said shafts coaxial with said pivot point.

16. The scraper blade assembly of claim 15 wherein one of said handles is mounted on each said shaft.

17. The scraper blade assembly of claim 12 including a frame on said device for separating solids and liquids, said fixed attachment points positioned on said frame.

18. The scraper blade assembly of claim 12 including a stop on said device to limit the motion of said handles and said scraper blade support when they are pivoted to bring said scraper blade out of engagement with said belt.

19. The scraper blade assembly of claim 12 wherein said device is a belt filter press.

* * * * *